R. LEBERTHON.
TOOL FOR WORKING THE EDGES OF WATCHCASES IN ORDER TO SUPPRESS THE SHAKING OF THE WORKS.
APPLICATION FILED APR. 30, 1914.
1,117,408.
Patented Nov. 17, 1914.
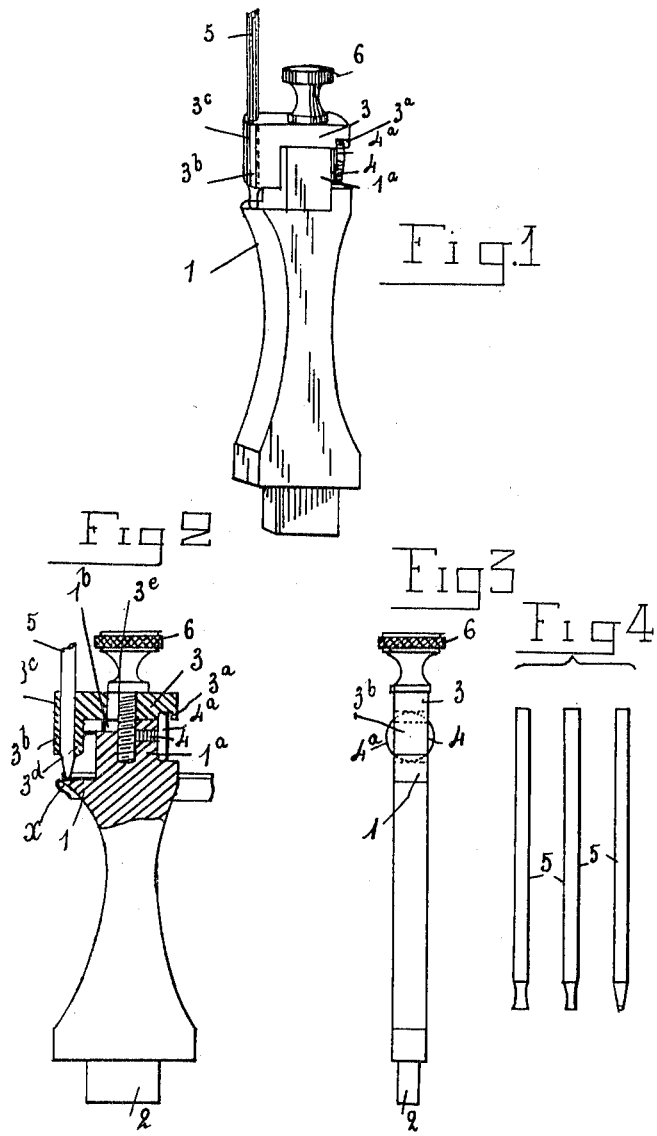

UNITED STATES PATENT OFFICE.

RAOUL LEBERTHON, OF CHAMPDENIERS, FRANCE.

TOOL FOR WORKING THE EDGES OF WATCHCASES IN ORDER TO SUPPRESS THE SHAKING OF THE WORKS.

1,117,408.  Specification of Letters Patent.  Patented Nov. 17, 1914.

Application filed April 30, 1914. Serial No. 835,566.

*To all whom it may concern:*

Be it known that I, RAOUL LEBERTHON, a citizen of the French Republic, residing at Champdeniers, in the Republic of France, have invented certain new and useful Improvements in Tools for Working the Edges of Watchcases in Order to Suppress the Shaking of the Works, of which the following is a specification.

This invention relates to a tool for working the edges of watch cases in order to suppress the shaking of the works in the case. This tool consists of an anvil over which according to the dimension of the edge of the watch case a carriage can move which has a hole through which the punch can project. The carriage is moved by means of a screw and it is fixed in the proper position by means of another screw screwed through a hole of the carriage.

In the accompanying drawings the invention is shown by way of example.

Figure 1 is a perspective view of the tool. Fig. 2 is an elevation partly in section. Fig. 3 is a side elevation of the tool. Fig. 4 shows different punches.

The tool is composed of an anvil 1 adapted to be placed by means of a square end 2 into the vise of the working table. The anvil 1 has a carriage 3 adapted to be moved by means of a screw 4 screwed into a cavity $1^a$ of the anvil. The head $4^a$ of the screw 4 acts in a groove $3^a$ of the carriage 3. At the side of the carriage opposite to the groove $3^a$ a guide piece $3^b$ is arranged which has a channel $3^c$ designed to receive the punch 5 which is thus well centered and guided.

In order to avoid that the carriage 3 moves to the right or to the left there is arranged in the part $1^a$ of the anvil a groove $1^b$ with which engages a feather $3^d$ of the carriage 3. If the carriage 3 is in proper position it can be fixed by means of a screw 6 which projects through an oblong hole $3^e$ of the carriage so that it is not necessary to remove the screw for moving the carriage.

To utilize this tool the square part 2 is placed in the vise whereupon the edge $x$ of the case is inserted in the beak of the anvil. The position of the carriage 3 is regulated by means of the screw 4 so that the end of the punch is brought just above the part to be worked, that is to say in such a position that the edge of the punch is in contact with the edge of the case whereupon the carriage is fixed by means of the said screw 6. After the parts have been adjusted in this manner the edge is hammered in order to reduce the inner diameter or it is hammered only at several parts in which the smallest punch would be used. With small watches the carriage has first to be completely removed before the edge can be placed on the beak of the anvil as otherwise the edge could not be inserted as its inner diameter is smaller than the length of the carriage.

I claim:—

1. A device for working the edges of watch cases comprising in combination, an anvil, a carriage mounted on said anvil, screw means for adjusting said carriage, means for guiding said carriage means for fixing said carriage in position with respect to said anvil, and a punch mounted in said carriage above said anvil surface.

2. A device for working the edges of watches, comprising in combination, an anvil having a beak laterally projecting therefrom, a movable carriage mounted on said anvil above said beak, and a punch mounted in said carriage above said beak.

In witness whereof I have hereunto set my hand in the presence of two witnesses.

RAOUL LEBERTHON.

Witnesses:
CHAS. P. PRESSLY.
ROBERT SCHREYER.

Copies of this patent may be obtained for five cents each, by addressing the "Commissioner of Patents, Washington, D. C."